United States Patent
Ray (10) Patent No.: US 8,467,105 B2
(45) Date of Patent: Jun. 18, 2013

(54) OPTIMAL CONTRAST LEVEL DRAFT-MODE PRINTING USING SPATIAL FREQUENCY ANALYSIS

(75) Inventor: Elton T. Ray, Livonia, NY (US)

(73) Assignee: Xerox Corporation, Norwalk, CT (US)

( * ) Notice: Subject to any disclaimer, the term of this patent is extended or adjusted under 35 U.S.C. 154(b) by 187 days.

(21) Appl. No.: 13/027,622

(22) Filed: Feb. 15, 2011

(65) Prior Publication Data

US 2012/0206772 A1 Aug. 16, 2012

(51) Int. Cl.
*G06K 15/02* (2006.01)

(52) U.S. Cl.
USPC .............................. 358/3.24; 358/1.9; 358/2.1

(58) Field of Classification Search
USPC .......................................... 358/3.24, 2.1, 1.9
See application file for complete search history.

(56) References Cited

U.S. PATENT DOCUMENTS

| | | | |
|---|---|---|---|
| 5,731,388 A | 3/1998 | Suzuki et al. | |
| 6,032,004 A | 2/2000 | Mirabella, Jr. et al. | |
| 6,266,153 B1 | 7/2001 | Davidson et al. | |
| 6,315,388 B1 | 11/2001 | Goh | |
| 6,791,714 B1 | 9/2004 | Ishimura et al. | |
| 6,816,179 B2 | 11/2004 | Hanyu | |
| 6,891,560 B2 | 5/2005 | Kwak et al. | |
| 6,965,457 B2 * | 11/2005 | Nakanishi et al. | 358/2.1 |
| 7,300,218 B2 | 11/2007 | Ryan, Jr. et al. | |
| 7,398,029 B2 | 7/2008 | Jacobsen et al. | |
| 7,602,510 B2 | 10/2009 | Rombola et al. | |
| 2007/0153308 A1 * | 7/2007 | Zemach et al. | 358/1.9 |
| 2008/0055620 A1 * | 3/2008 | Usui et al. | 358/1.9 |
| 2008/0284804 A1 * | 11/2008 | Seccombe | 347/9 |
| 2009/0051979 A1 | 2/2009 | Tai et al. | |
| 2009/0086227 A1 * | 4/2009 | Nagai | 358/1.9 |

FOREIGN PATENT DOCUMENTS

JP 2009151010 7/2009

* cited by examiner

*Primary Examiner* — King Poon
*Assistant Examiner* — Andrew H Lam
(74) *Attorney, Agent, or Firm* — Gibb & Riley, LLC (57) ABSTRACT

Devices and methods herein receive a command into a computerized device to perform a printing draft operation of a printable item using a reduced amount of marking material (a reduced amount of ink, toner, etc.). The methods herein evaluate at least two different regions of the printable item to determine spatial frequencies of the different regions, and calculate at least two marking material reduction values for the different regions of the printable item based on the spatial frequencies of the different regions. Then, the methods herein apply the marking material reduction values to the printable item to produce a file containing reduced marking material printing commands for a printing device to print the printable item.

12 Claims, 8 Drawing Sheets

NOTE: SMALLER TEXT IS DARKER
(HIGHER FREQUENCY)

OPTIMAL CONTRAST LEVEL DRAFT-MODE PRINTING USING SPATIAL FREQUENCY ANALYSIS

BACKGROUND

Embodiments herein generally relate to computerized and printing devices and methods and more particularly to providing draft printing processes that use less ink and toner, yet still make all printed features easily viewable by the user by determining the optimal contrast level for draft-mode printing using a spatial frequency analysis.

In order to lessen the environmental impact of modern printing devices, and to reduce operating costs, sometimes it may be desirable to print document and image drafts at lower quality settings using reduced ink and toner settings. Many times such lower quality draft prints are desirable because the viewer is not interested in the quality of the printing, but instead is only concerned with the layout, accuracy, impact, etc., of the printed item. A user may print and discard many versions of the draft document before they arrive at a finalized item that they wish to print in high-quality.

Therefore, when reviewing a draft print, the user is often happy to work with lower quality prints when going through a series of draft documents because such lower quality prints reduce the amount of ink or toner being consumed, which helps reduce the user's costs (and reduces the user's impact upon the environment) so long as there is a minimum readable lightness.

However, when reducing the amount of ink or toner needed to produce a draft document, it is still desirable that all printed items be visible on the draft document. This could result in some printed items being printed at an unnecessarily higher quality in order to assure that all printed items are made visible on the printed sheet. Thus, there are still many areas for reducing the amount of marking material (ink, toner, etc.) when providing draft printing.

SUMMARY

In order to address such issues, exemplary methods herein receive a command into a computerized device to perform a draft printing operation of a printable item using a reduced amount of marking material (a reduced amount of ink, toner, etc.). The reduced amount of marking material is "reduced" relative to a standard amount of marking material used in a standard printing operation. The methods herein evaluate at least two different regions of the printable item to determine spatial frequencies of the different regions, and calculate at least two marking material reduction values for the different regions of the printable item based on the spatial frequencies of the different regions (using the computerized device). Then, the methods herein apply the marking material reduction values to the printable item to produce a file (e.g., a printer-ready raster image processed file) containing reduced marking material printing commands for a printing device to print the printable item, using the computerized device.

In some embodiments, the process of calculating the marking material reduction values is based on human contrast recognition patterns for different spatial frequencies, and the relationship between such human contrast recognition patterns and the different spatial frequencies is non-linear.

When identifying the different regions of the printable item the embodiments herein can simply divide the printable item into a grid (or other geometric pattern) of different regions; can identify features within the printable item and classify each of the features as one of the different regions; and/or can receive user input of suggestions for the different regions.

Other exemplary methods herein receive a command into a printing device to perform a printing operation of a printable item using a reduced amount of marking material (a reduced amount of ink, toner, etc.). The reduced amount of marking material is "reduced" relative to a standard amount of marking material used in a standard printing operation. The methods herein evaluate at least two different regions of the printable item to determine spatial frequencies of the different regions, and calculate at least two marking material reduction values for the different regions of the printable item based on the spatial frequencies of the different regions (using the printing device). Then, the methods herein apply the marking material reduction values to the printable item to produce a file (e.g., a printer-ready raster image processed file) containing reduced marking material printing commands, and print a reduced marking material version of the printable item on printing media according to the reduced marking material printing commands, using the printing device.

Additional embodiments herein provide a computerized device that includes an input/output device. The input output device receives a command to perform a printing operation of a printable item using a reduced amount of marking material (relative to the standard amount of marking material used in a standard printing operation). A processor is operatively connected to the input/output device, and the processor evaluates at least two different regions of the printable item to determine spatial frequencies of the different regions. The processor calculates at least two marking material reduction values for the different regions of the printable item based on the spatial frequencies of the different regions. The processor also applies the marking material reduction values to the printable item to produce a file containing reduced marking material printing commands for a printing device to print the printable item (and the input/output device can output this file).

In such embodiments, the processor can also identify the different regions of the printable item by dividing the printable item into a grid of the different regions; by identifying features within the printable item and classifying each of the features as one of the different regions; and/or by receiving user input of suggestions for the different regions.

A further embodiment comprises a printing device having an input/output device that receives a command to perform a printing operation of a printable item using a reduced amount of marking material. A processor is operatively connected to the input/output device, and the processor evaluates at least two different regions of the printable item to determine spatial frequencies of the different regions. Further, a printing engine is operatively connected to the processor and the input/output device.

The processor calculates at least two marking material reduction values for the different regions of the printable item based on the spatial frequencies of the different regions. The processor also applies the marking material reduction values to the printable item to produce a file containing reduced marking material printing commands. The printing engine prints a reduced marking material version of the printable item on printing media according to the reduced marking material printing commands.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, when reducing the amount of ink or toner needed to produce a draft document, it is still desirable that all printed items be visible on the draft document. This could result in some printed items being printed at an unnecessarily higher quality in order to assure that all printed items are made visible on the printed draft sheet. In order to address this issue, the embodiments herein provide draft printing processes that use less ink and toner, yet still makes all printed features easily viewable by the user by determining the optimal contrast levels for draft-mode printing using a spatial frequency analysis.

Human perception of contrast is different depending on the spatial frequency of the light items and dark items in an image. The relationship between spatial frequency and perceivable contrast is non-linear. If a designer of a draft printing system wants to pick a single, minimum lightness draft printing toner amount (to have the ability to print a wide range of images) the designer needs to pick a safe toner reduction value that is away from the edge of perception; however, this results in a toner utilization that is often darker than it needs to be for many printed features.

Spatial frequency is a characteristic of any structure that is periodic across positions in space. The spatial frequency is a measure of how often sinusoidal components (as determined by a Fourier transform, for example) of the structure repeat per unit of distance. The unit of spatial frequency is cycles per meter. In image processing applications, spatial frequency is often expressed in units of cycles per millimeter and sometimes in units of line pairs per millimeter.

Therefore, the frequency of toner spots that are to be printed in a given area can be determined on a pixel-by-pixel analysis of a given image to be printed to find the toner spatial frequency (in amounts per millimeter, for example) of that area. Similarly, a density analysis, saturation analysis, and other similar processes can determine the spatial frequency of marking material that will be required for a given image or portion of an image.

In other words, due to the non-linear nature of human contrast perception relative to the spatial frequency of image data, most designers who implement draft printing chose lightness values that are well within the range of human perception so as to be able to render the widest range of images readable. This is wasteful however, as it is only the higher and lower ends of the spatial frequency spectrum that require higher contrast to be perceived. By analyzing the image and rendering different portions of the image at different toner reduction amounts (depending on their spatial frequency) the embodiments herein can make some parts of an image even lighter and require less toner to print them.

The embodiments herein analyze the images and vary the minimum lightness value according to the spatial frequency of each region in an image. The result is that most regions of an image can be printed lighter without losing the ability to read all printed features. Thus, the embodiments herein provide a way to use less toner when draft printing by pushing contrast closer to the edge of human perception.

Figure 1:
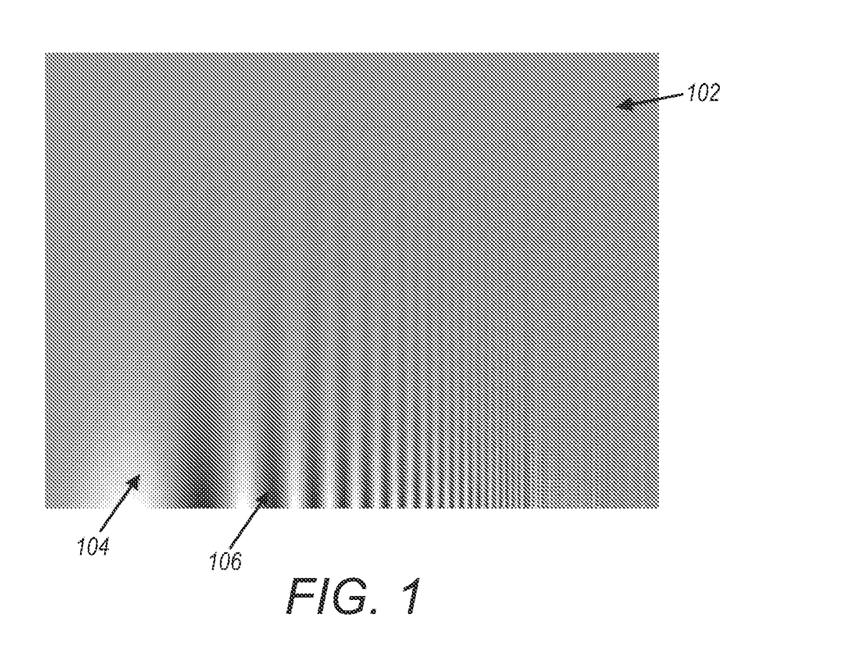
FIG. 1 is a schematic diagram showing contrast relative to spatial frequency illustrating the operation of embodiments herein.

To help illustrate the extent to what a human perceives, FIG. 1 provides a graph of contrast relative to spatial frequency. The solid gray areas 102 represent spatial frequencies where human perception of contrast drops off, while the light and dark areas 104, 106 illustrate regions where human perception of contrast is strong.

Figure 2:
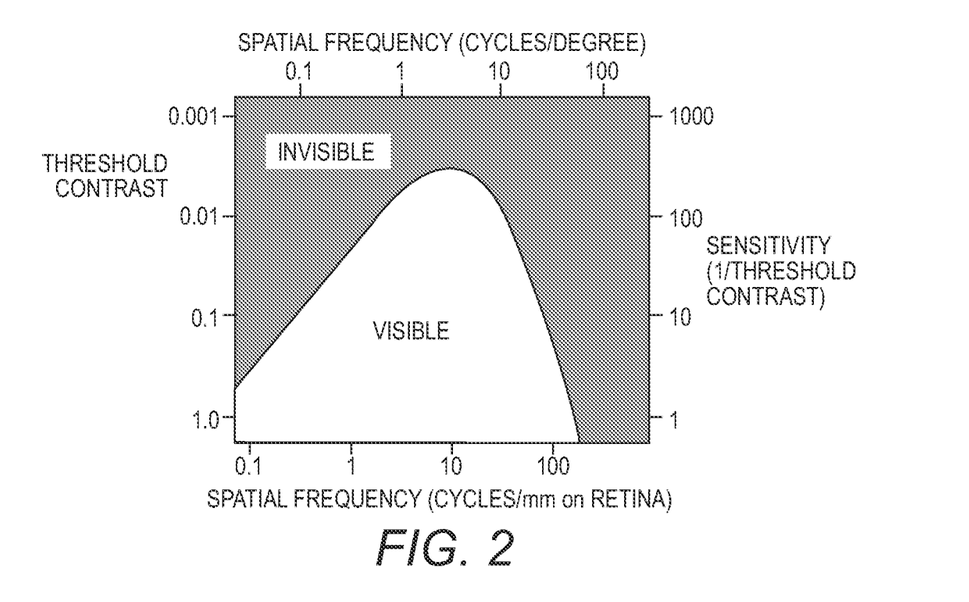
FIG. 2 is a graph demarking the range of human contrast perception illustrating the operation of embodiments herein.
Figure 3:
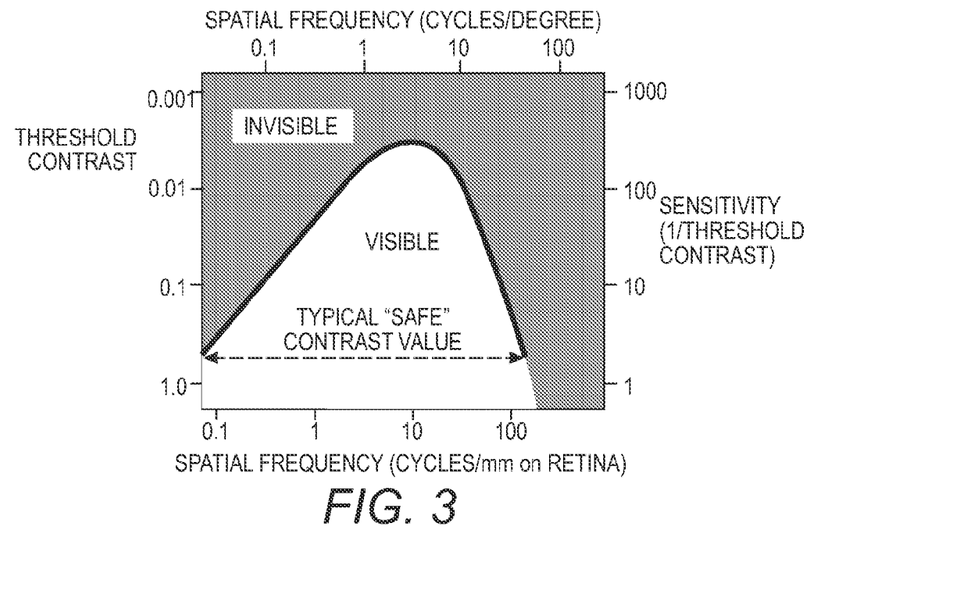
FIG. 3 is a graph demarking the range of human contrast perception illustrating the operation of embodiments herein.

This is also illustrated in FIG. 2, which is a graph demarking the range of human contrast perception for an adult human. FIG. 3 is the same graph as that shown in FIG. 2; however, in FIG. 3 the dotted line in the lower area of the graph represents the typical "safe" contrast value that most draft printing implementers select. Notice that, in FIG. 3, there is a wide range of contrast values above this dotted line that would be perfectly visible, and would require less toner to print.

Figure 4:
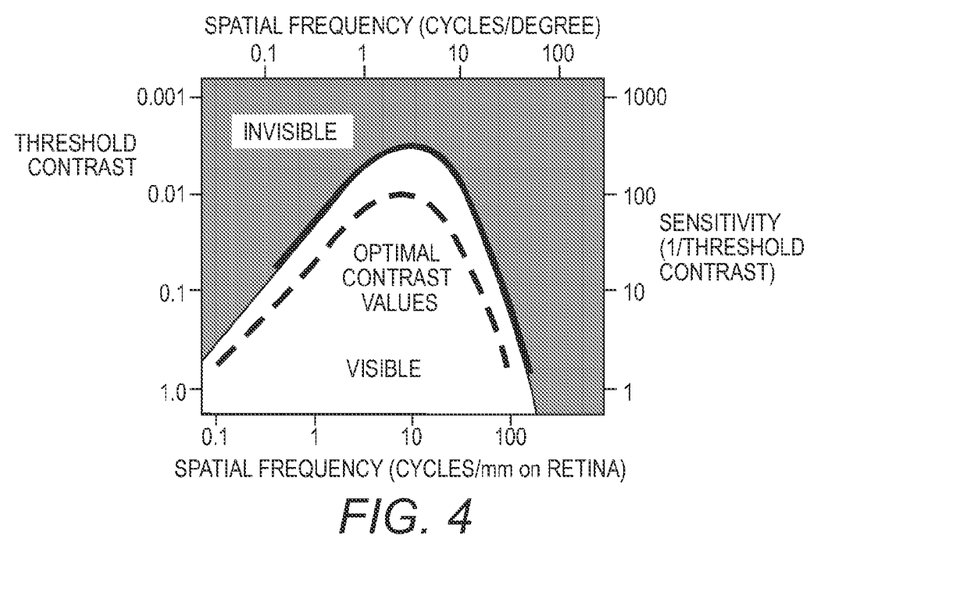
FIG. 4 is a graph demarking the range of human contrast perception illustrating the operation of embodiments herein.

In view of this, as shown by the dashed line in FIG. 4, the embodiments herein vary the amount of marking material reduction depending upon spatial frequency of the region of the image being printed. Therefore, as shown in FIG. 4, the embodiments herein push the marking material reduction into the lighter contrast regions for the mid-range spatial frequencies and allow those to be printed lighter, saving toner when compared to systems that choose a flat toner reduction amount as was done in FIG. 3.

Figure 5A:
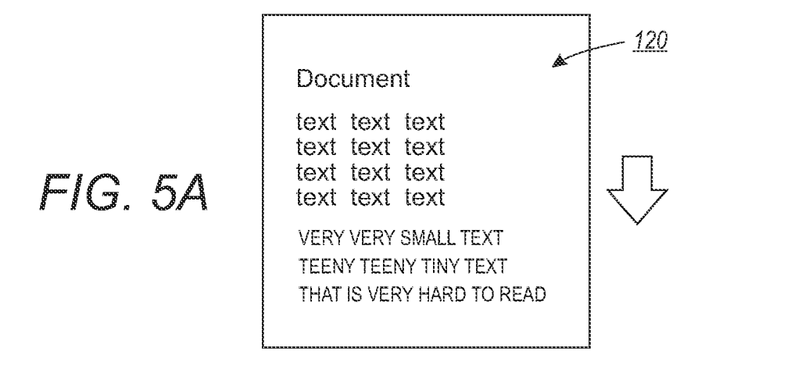
FIGS. 5A-E are schematic diagrams of printable images illustrating the operation of embodiments herein.
Figure 5B:
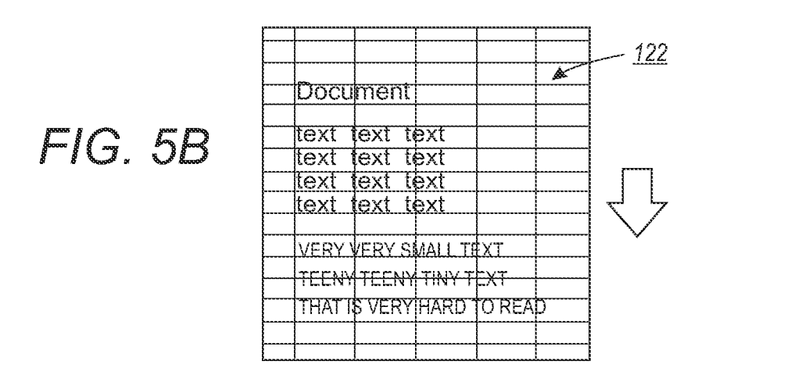
Figure 5C:
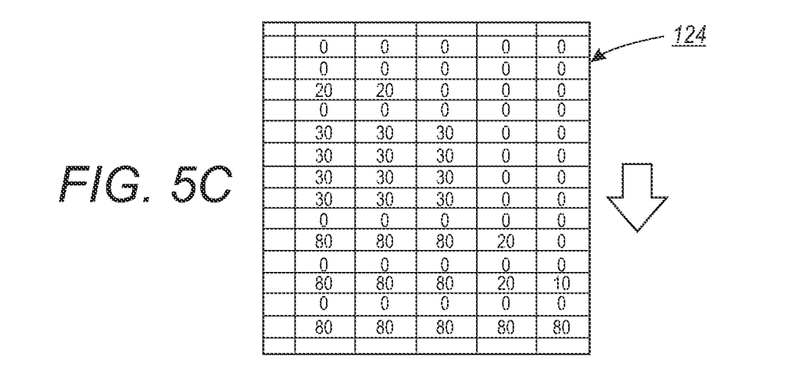
Figure 5D:
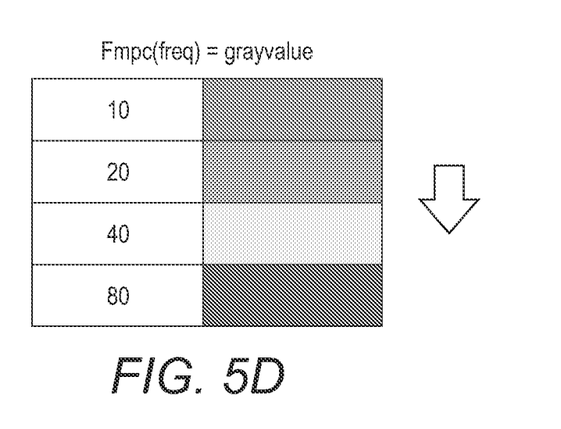
Figure 5E:
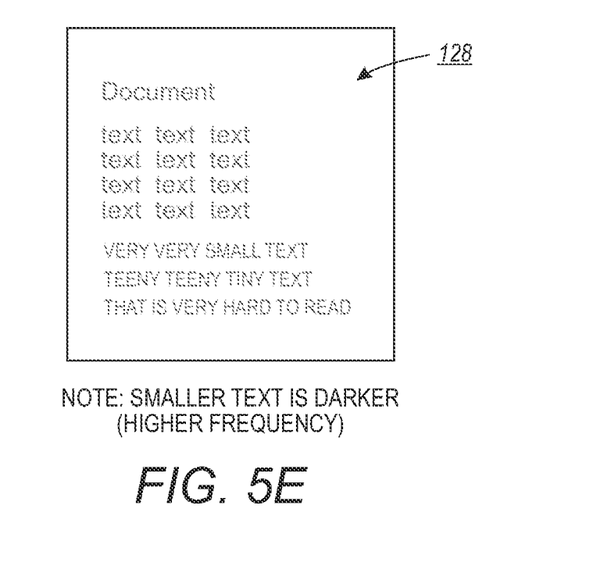

In one intentionally simplified example shown in FIGS. 5A-5E, the embodiments herein segment an image 120 (FIG. 5A) into relatively small zones 122 (FIG. 5B). For each zone 122, the embodiments herein determine the spatial frequency 124 for that zone 122 (FIG. 5C). The spatial frequencies shown in FIG. 5C can be calculated, for example, by taking the root mean squared for the upper and lower lightness values within the region 122 and dividing by the length of the image 120 (as well as other similar methods). Next, the embodiments herein use the human perception limits function shown, for example, by the dashed line in FIG. 4 to determine a new lower-contrast, but still visible gray value for each region (FIG. 5D). Then, all pixels in a region are adjusted by that amplitude to achieve the appropriate toner reduction image 128 (FIG. 5E).

Figure 6:
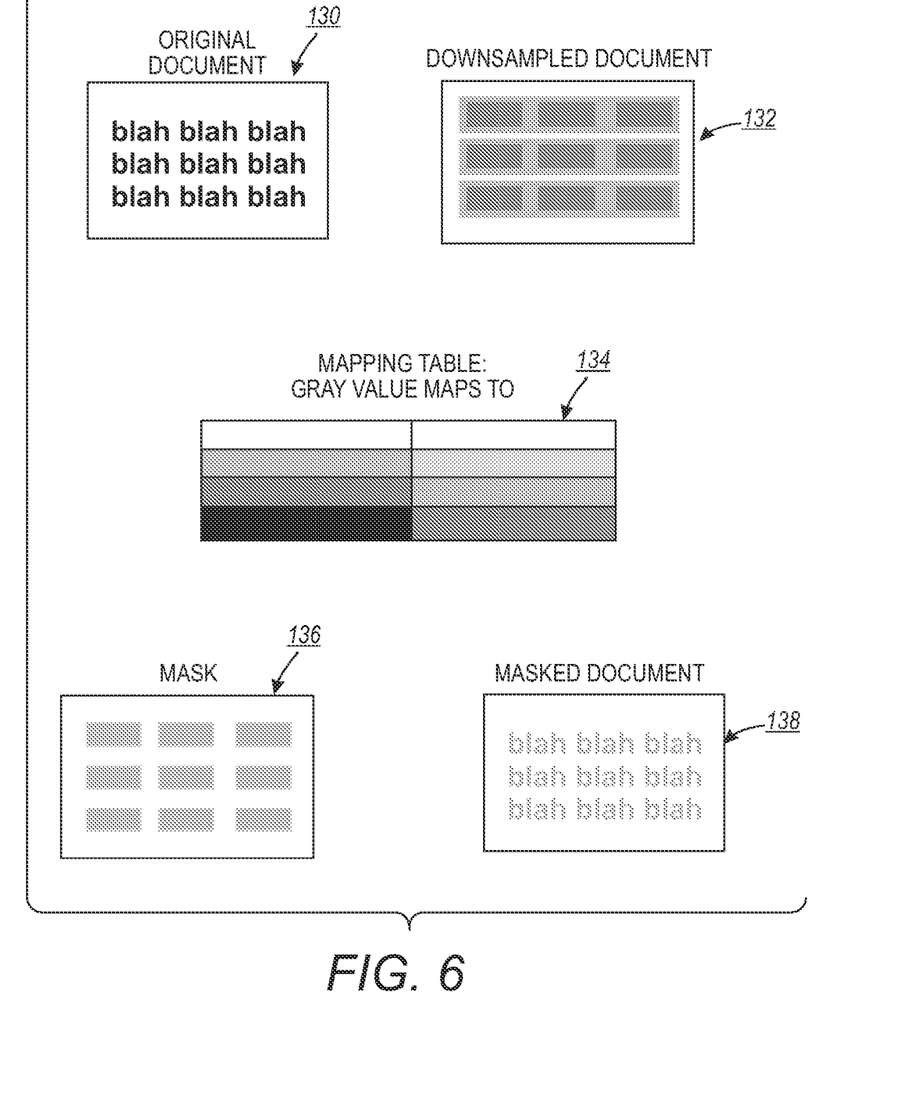
FIG. 6 is a schematic diagram of printable images illustrating the operation of embodiments herein.

As shown in FIG. 6, additional alternatives herein can downsample an image 130 and use the resulting gray values 132 to estimate the spatial frequency. Then after using a mapping table to map the grey values to reduced toner values (134) this method can apply a mask 136 to the original image 130 based on the reduced toner gray values to produce a masked draft print document 138.

Figure 7:
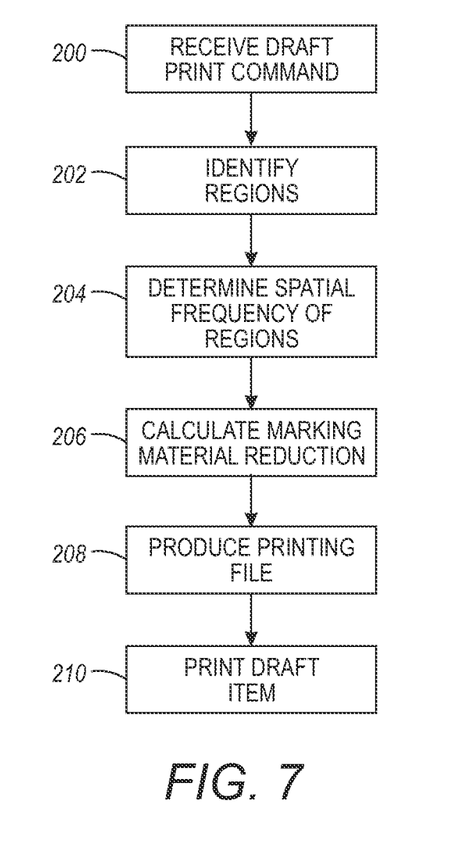
FIG. 7 is a flow diagram illustrating embodiments herein.

The embodiments herein are shown in flowchart form in FIG. 7. Here, some exemplary methods receive a command into a computerized device (200) to perform a draft printing operation of a printable item using a reduced amount of marking material (a reduced amount of ink, toner, etc.). The reduced amount of marking material is "reduced" relative to a standard amount of marking material used in a standard printing operation.

In item 202, the methods herein identify at least two different regions of the printable item. When identifying the different regions of the printable item in item 202, the embodiments herein can simply divide the printable item into a grid (or other geometric pattern, as shown in FIG. 5B, above) of different regions; can identify features within the printable item and classify each of the features as one of the different regions (as shown in FIG. 8, discussed below); and/or can receive user input of suggestions for the different regions.

Figure 8:
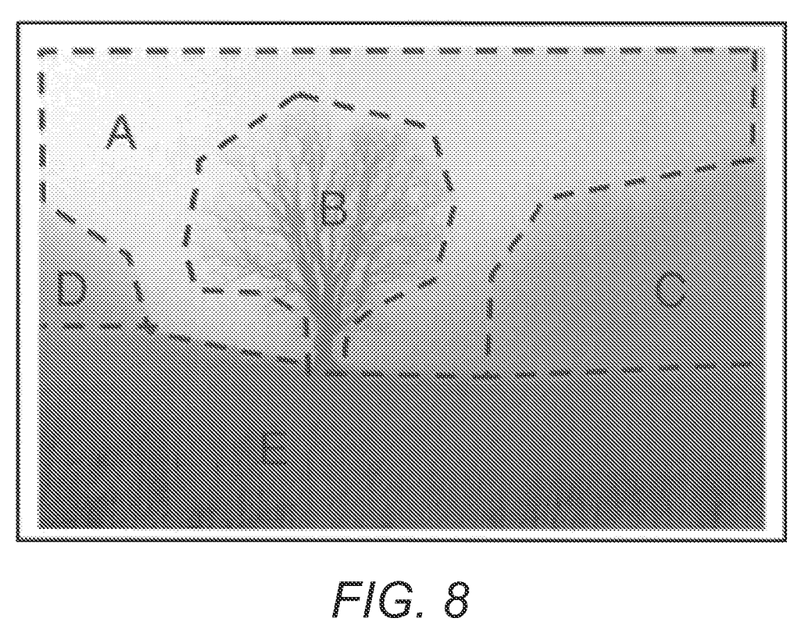
FIG. 8 is a schematic diagram of printable images illustrating the operation of embodiments herein.

More specifically, as illustrated in FIG. 8, image recognition software can be used to automatically identify different regions within an image. For example, as shown in FIG. 8, five different regions A-E are illustrated as being shapes to follow various items (ground, trees, sky, etc.) within an image. The identification of such regions A-E can be automatic through software programs that recognize shapes, specific colors (sky, skin, etc.), and other features. Alternatively, the user can be provided an option to circle, identify, or pick various features within an image using a graphic user interface and the embodiments herein would use such a classification in the draft printing process described above.

In item 204, the methods herein evaluate at least two different regions of the printable item to determine spatial frequencies of the different regions. In item 206, the methods herein calculate at least two marking material reduction values, one for each of the different regions of the printable item based on the spatial frequencies of the different regions (using the computerized device).

In some embodiments, the process of calculating the marking material reduction values in item 206 is based on human contrast recognition patterns for different spatial frequencies, and the relationship between such human contrast recognition patterns and the different spatial frequencies is non-linear.

Then, in item 208, the methods herein apply the marking material reduction values to the printable item to produce a file (e.g., a printer-ready raster image processed file) containing reduced marking material printing commands for a printing device to print the printable item, using the computerized device. In item 210, the methods herein print the reduced marking material version of the printable item on printing media according to the reduced marking material printing commands, using the printing device.

Figure 9:
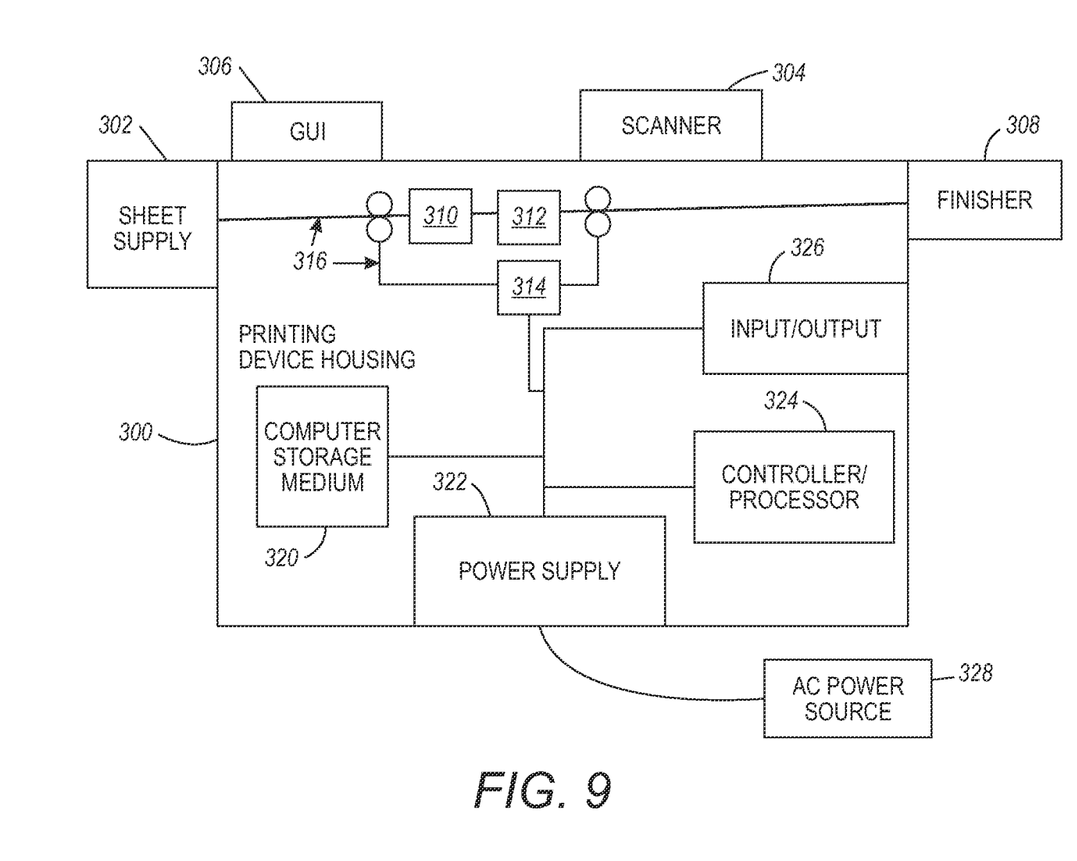
FIG. 9 is a schematic diagram of a printing device according to embodiments herein.

FIG. 9 illustrates a computerized device (or a computerized printing device) 300, which can be used with embodiments herein and can comprise, for example, a printer, copier, multi-function machine, etc. The printing device 300 includes a controller/processor 324, at least one marking device (printing engine) 310, 312, 314 operatively connected to the processor 324, a media path 316 positioned to supply sheets of media from a sheet supply 302 to the marking device(s) 310, 312, 314, and a communications port (input/output) 326 operatively connected to the processor 324 and to a computerized network external to the printing device. After receiving various markings from the printing engine(s), the sheets of media can optionally pass to a finisher 308 which can fold, staple, sort, etc., the various printed sheets.

Also, the printing device 300 can include at least one accessory functional component (such as a scanner/document handler 304, sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 connects to an external alternating current power source 328 and converts the external power into the type of power needed by the various components.

As would be understood by those ordinarily skilled in the art, the printing device 300 shown in FIG. 9 is only one example and the embodiments herein are equally applicable to other types of printing devices that may include less components or more components. For example, while a limited number of printing engines and paper paths are illustrated in FIG. 9, those ordinarily skilled in the art would understand that many more paper paths and additional printing engines could be included within any printing device used with embodiments herein.

In such a computerized (printing) device 300, the input/output device 326 receives a command to perform a draft printing operation of a printable item using a reduced amount of marking material. The processor 324 evaluates at least two different regions of the printable item to determine spatial frequencies of the different regions. The processor 324 also calculates at least two marking material reduction values for the different regions of the printable item based on the spatial frequencies of the different regions. The processor 324 then applies the marking material reduction values to the printable item to produce a file containing reduced marking material printing commands. The printing engine 310, 312, 314 prints a reduced marking material version of the printable item on printing media according to the reduced marking material printing commands.

In such embodiments, the processor 324 can also identify the different regions of the printable item by dividing the printable item into a grid of the different regions; by identifying features within the printable item and classifying each of the features as one of the different regions; and/or by receiving user input of suggestions for the different regions.

Some printers and print drivers have a draft printing mode that uses less ink or toner than on standard prints. Such draft printing is usually noticeably lighter than normal printing, yet the toner concentration is maintained at a high enough level so that all features are still readable. Alternatively, in some user-controlled toner reduction solutions, the user may manually select toner saving fonts, selecting a lighter font color, etc. However, such user-control operations are time consuming, and the printed colors often look different than those that will appear in the final high-quality printed version.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    receiving a command into a computerized device to perform a draft printing operation of a printable item using a reduced amount of marking material relative to a standard amount of marking material used in a standard printing operation;
    evaluating regions of said printable item to determine spatial frequencies of relatively light regions and relatively dark regions, using said computerized device;
    calculating different marking material reduction values for said relatively light regions and said relatively dark regions of said printable item based on non-linear human contrast recognition patterns for said spatial frequencies of said relatively light regions and said relatively dark regions, using said computerized device; and
    applying said different marking material reduction values to said relatively light regions and said relatively dark regions of said printable item to produce a file containing reduced marking material printing commands for a printing device to print said printable item, using said computerized device.

2. The method according to claim 1, further comprising identifying said regions of said printable item by at least one of:
    dividing said printable item into a grid of said regions;
    identifying features within said printable item and classifying each of said features as one of said regions; and
    receiving user input of suggestions for said regions.

3. The method according to claim 1, said file containing reduced marking material printing commands comprising a printer-ready raster image processed file.

4. A method comprising:
    receiving a command into a printing device to perform a draft printing operation of a printable item using a reduced amount of marking material relative to a standard amount of marking material used in a standard printing operation;
    evaluating regions of said printable item to determine spatial frequencies of relatively light regions and relatively dark regions, using said printing device;
    calculating different marking material reduction values for said relatively light regions and said relatively dark regions of said printable item based on non-linear human contrast recognition patterns for said spatial frequencies of said relatively light regions and said relatively dark regions, using said printing device; and
    applying said different marking material reduction values to said relatively light regions and said relatively dark regions of said printable item to produce a file containing reduced marking material printing commands, using said printing device; and
    printing a reduced marking material version of said printable item on printing media according to said reduced marking material printing commands, using said printing device.

5. The method according to claim 4, further comprising identifying said regions of said printable item by at least one of:
    dividing said printable item into a grid of said regions;
    identifying features within said printable item and classifying each of said features as one of said regions; and
    receiving user input of suggestions for said regions.

6. The method according to claim 4, said file containing reduced marking material printing commands comprising a printer-ready raster image processed file.

7. A computerized device comprising:
    an input/output device receiving a command to perform a draft printing operation of a printable item using a reduced amount of marking material relative to a standard amount of marking material used in a standard printing operation; and
    a processor operatively connected to said input/output device, said processor evaluating regions of said printable item to determine spatial frequencies of relatively light regions and relatively dark regions, using said computerized device;
    said processor calculating different marking material reduction values for said relatively light regions and said relatively dark regions of said printable item based on non-linear human contrast recognition patterns for said spatial frequencies of said relatively light regions and said relatively dark regions, using said computerized device; and
    said processor applying said different marking material reduction values to said relatively light regions and said relatively dark regions of said printable item to produce a file containing reduced marking material printing commands for a printing device to print said printable item, and
    said input/output device outputting said file.

8. The computerized device according to claim 7, said processor further identifying said regions of said printable item by at least one of:
    dividing said printable item into a grid of said regions;
    identifying features within said printable item and classifying each of said features as one of said regions; and
    receiving user input of suggestions for said regions.

9. The computerized device according to claim 7, said file containing reduced marking material printing commands comprising a printer-ready raster image processed file.

10. A printing device comprising:
- an input/output device receiving a command to perform a draft printing operation of a printable item using a reduced amount of marking material relative to a standard amount of marking material used in a standard printing operation;
- a processor operatively connected to said input/output device, said processor evaluating regions of said printable item to determine spatial frequencies of relatively light regions and relatively dark regions;
- said processor calculating different marking material reduction values for said relatively light regions and said relatively dark regions of said printable item based on non-linear human contrast recognition patterns for said spatial frequencies of said relatively light regions and said relatively dark regions; and
- said processor applying said different marking material reduction values to said relatively light regions and said relatively dark regions of said printable item to produce a file containing reduced marking material printing commands, and
- said printing device printing a reduced marking material version of said printable item on printing media according to said reduced marking material printing commands.

11. The printing device according to claim 10, said processor further identifying said regions of said printable item by at least one of:
- dividing said printable item into a grid of said regions;
- identifying features within said printable item and classifying each of said features as one of said regions; and
- receiving user input of suggestions for said regions.

12. The printing device according to claim 10, said file containing reduced marking material printing commands comprising a printer-ready raster image processed file.

* * * * *